United States Patent [19]
Jones et al.

[11] Patent Number: 5,636,085
[45] Date of Patent: Jun. 3, 1997

[54] MAGNETIC READ/WRITE HEAD ASSEMBLY CONFIGURED WITH BLEED SLOTS PASSING THROUGH RAILS TO STABILIZE FLEXIBLE MEDIUM WHILE ATTAINING LOW FLY HEIGHS WITH RESPECT THERETO

[75] Inventors: David E. Jones, Layton; Brian R. Schick, Eden; Mark S. Thayne, West Point, all of Utah

[73] Assignee: Iomega Corporation, Roy, Utah

[21] Appl. No.: 398,285

[22] Filed: Mar. 3, 1995

[51] Int. Cl.[6] .......................... G11B 17/32; G11B 5/187; G11B 5/60
[52] U.S. Cl. .......................... 360/103; 360/122; 360/104
[58] Field of Search ........................ 360/103, 122, 360/104, 105

[56] References Cited

U.S. PATENT DOCUMENTS

| | | | |
|---|---|---|---|
| 3,855,625 | 12/1974 | Garnier et al. | 360/103 |
| 4,414,592 | 11/1983 | Losee et al. | 360/102 |
| 4,419,705 | 12/1983 | Brower et al. | 360/103 |
| 4,646,180 | 2/1987 | Ohtsubo | 360/103 |
| 4,663,682 | 5/1987 | McNeil | 360/105 |
| 4,673,996 | 6/1987 | White | 360/103 |
| 4,757,402 | 7/1988 | Mo | 360/103 |
| 4,814,906 | 3/1989 | Suzuki et al. | 360/103 |
| 4,870,519 | 9/1989 | White | 360/103 |
| 4,901,173 | 2/1990 | Jones et al. | 360/99.04 |
| 4,974,106 | 11/1990 | White et al. | 360/102 |
| 4,975,794 | 12/1990 | Losee et al. | 360/104 |
| 5,086,360 | 2/1992 | Smith et al. | 360/103 |
| 5,184,263 | 2/1993 | Fukakusa et al. | 360/103 |
| 5,189,574 | 2/1993 | Imamura et al. | 360/103 |
| 5,220,470 | 6/1993 | Ananth et al. | 360/103 |
| 5,237,472 | 8/1993 | Morehouse et al. | 360/105 |

FOREIGN PATENT DOCUMENTS

| | | | |
|---|---|---|---|
| 61-057087 | 3/1986 | Japan . | |
| 61-273784 | 12/1986 | Japan . | |
| 63-255883 | 10/1988 | Japan | 360/103 |
| 63-298879 | 12/1988 | Japan | 360/103 |
| 2-049280 | 2/1990 | Japan | 360/103 |
| 3-248380 | 11/1991 | Japan | 360/103 |
| 4-069875 | 3/1992 | Japan . | |

*Primary Examiner*—Craig A. Renner
*Attorney, Agent, or Firm*—Woodcock Washburn Kurtz Mackiewicz & Norris

[57] ABSTRACT

A magnetic read/write assembly for a flexible disk drive has rails with slots between the ends thereof. These slots provide an air bleed in the air bearing surface of the rails. The air bleed capacity of the slots, the width of the rails and the load force applied by flexures provide optimal width of the rails for stabilizing the media while maintaining a low fly height of the electro-magnetic elements on the media.

13 Claims, 3 Drawing Sheets

MAGNETIC READ/WRITE HEAD ASSEMBLY CONFIGURED WITH BLEED SLOTS PASSING THROUGH RAILS TO STABILIZE FLEXIBLE MEDIUM WHILE ATTAINING LOW FLY HEIGHS WITH RESPECT THERETO

BACKGROUND OF THE INVENTION

This invention relates to magnetic head assemblies for reading/writing data on flexible media, and more particularly, to a slider which stabilizes flexible media and at the same time, has a low fly height.

Magnetic recording and playback at high densities in digital computer systems requires that a constant spacing be maintained between the record medium and the magnetic read/write head. In this type of magnetic recording, the magnetic head is separated from the magnetic record medium by an air bearing which must be of a small, constant, height to maintain the proper resolution of the writing and reading on the record medium. Flexible recording mediums, such as "floppy" disks, tend to flutter at high speeds. This, and other factors, change the spacing and stability between the record medium surface and the magnetic head.

U.S. Pat. No. 4,414,592-Losee recognizes the problems and describes a coupler which stabilizes the media.

"Winchester" heads have been extensively used for hard disk drives and they have been proposed for use with flexible, or "floppy", recording media. U.S. Pat. No. 5,189,574-Inamura, et al is an example.

It is important to maintain stability of the flexible media while at the same time keeping a low fly height in order to get good writing and reproducibility. Lower fly heights can be achieved by providing a narrow rail width on the slider and higher loading forces. However, with flexible media the straightening, or stabilizing, effect of the rails is substantially decreased as the width is reduced.

The use of rails having slots therein is known. See, for example, FIG. 11 of U.S. Pat. No. 4,870,519.

It is an object of the present invention to provide an optimal rail width, bleed capacity of the slots in the rails, and loading force of the flexures to provide low fly height of the electro-magnetic elements in the slider while obtaining good stabilization of the flexible media.

SUMMARY OF THE INVENTION

In accordance with the present invention, a magnetic read/write slider has rails with cross-cut slots between the end thereof to provide an air bleed in the air bearing surface of the rails. The air bleed capacity of the slots, the width of the rails, and the load force applied by the flexures are selected to provide an optimal width of the rails for stabilizing the media while at the same time maintaining a low fly height of the electro-magnetic elements on the media.

The heads are used in conjunction with a rotary or linear actuator to achieve extremely low flying characteristics on any and all of the air bearing surfaces, while at the same time achieving excellent performance throughout a large tolerance range of pitch, roll and penetration. By carefully placing a cross-cut air bleed slot in the air bearing surfaces of multiple rails and maintaining reasonably wide rail widths, flexible media can be stabilized and at the same time achieve very low fly height.

Two opposing sets of flexures apply load force to the head to read data from both sides of the media. Lower fly heights are achieved by narrow rail widths and higher loading forces. However, with flexible media the straightening effect of the rails is substantially decreased as the width is reduced. The cross cut allows for wide rails and low fly height in combination.

By using two opposing load beams/gimbals and allowing both to operate freely, as opposed to fixing one side and allowing only the opposing load beam to move, more operating range is achieved. The alignment of the head gimbal assembly (HGA) must be opposing each other, but tolerances are easily achievable.

The factor of gap placement when using composite cores is critical. Since the heads fly at a single angle to the media, the placement of the read/write gap is critical in order to achieve the lowest fly height and yet stay far enough from the trailing edge that modulation does not occur. Protection of the gap from wear is achieved by correct placement. Selective placement is simple in that the core can remain standard, while the trailing edge bevel length is altered in the normal beveling process.

The invention has the following advantages over the prior art:

1. Wider rails for stabilization of flexible media and at the same time low fly height.
2. Multiple rails in close contact to allow any or all rails to have a read/write gap on them.
3. A dampening effect on the media after the surface passes by the air bleed (cross-cut) slot and prior to being introduced to the read/write gap. This is critical to obtaining all rails in good coupling with the media in the "pinch design" where the head gimbal assemblies oppose each other.

The foregoing and other objects, features and advantages of the invention will be better understood from the following more detailed description and appended claims.

DESCRIPTION OF THE PREFERRED EMBODIMENT

Figure 1:
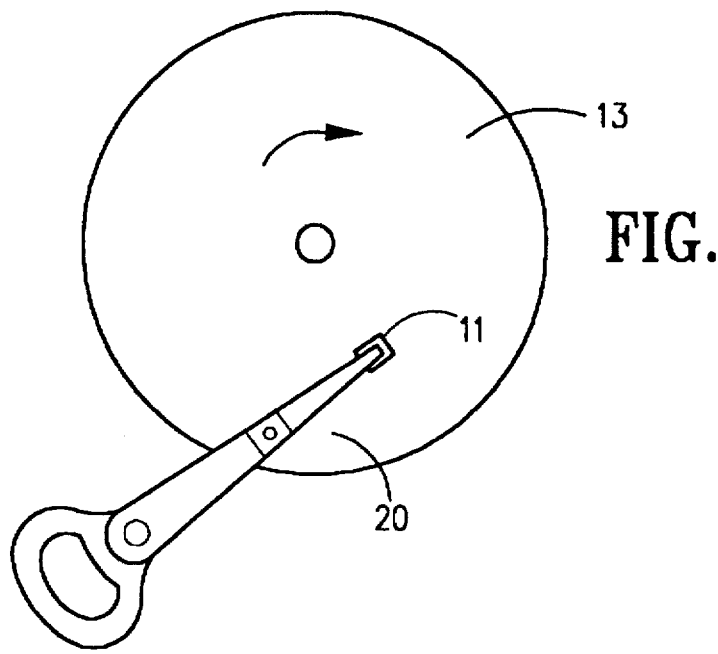
FIG. 1 is a plan view of a flexible disk, and a flexure with a planar ramp read/write transducer.
Figure 2:
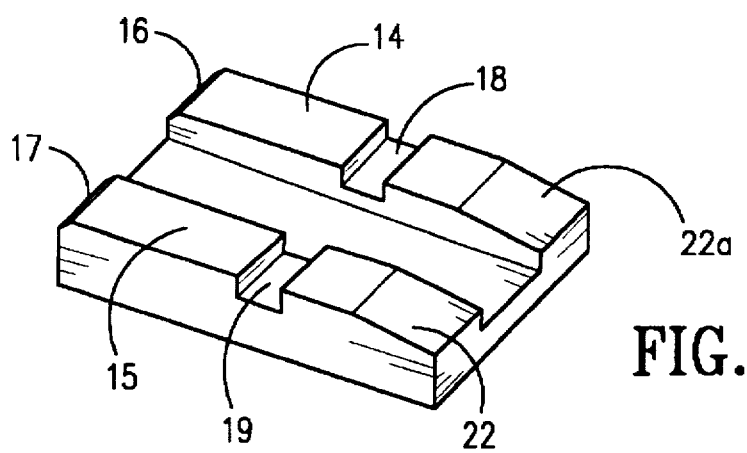
FIG. 2 shows the rails, electro-magnetic elements, cross-cut slots and ramps.

A magnetic read/write head assembly includes sliders 11 and 12 which read and write data recorded on the flexible magnetic medium 13. Longitudinal rails 14 and 15 on the slider extend in the direction of movement of the media. Each rail has a width which extends perpendicular to the direction of movement of the media. Electro-magnetic read/write elements 16 and 17 extend partially, or fully, across the width of the rails at the trailing longitudinal end of the rails.

Cross-cut slots 18 and 19 between the ends of the rails provide an air bleed in the air bearing surface of the rails.

Figure 3:
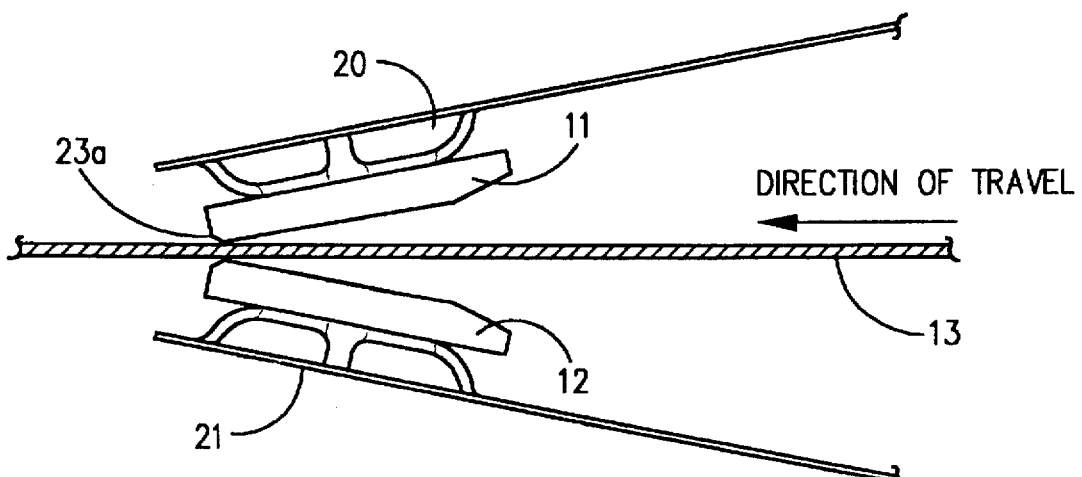
FIG. 3 is an enlarged view of the flexures, media and rail with dimensions and angles greatly exaggerated.

Bevels 22 and 22a are on the leading edge of each rail. Bevels 23 and 23a are on the trailing edge of each rail. As best shown in FIG. 3, each of the rails is at an angle to the media with the leading end thereof further from the media than the trailing edge.

In accordance with the present invention, the air bleed capacity of slots 18 and 19, the width of the rails and the load force are selected to provide optimal width of the rails for stabilizing the media while maintaining a low fly height of the electro-magnetic elements on the media.

Figure 4:
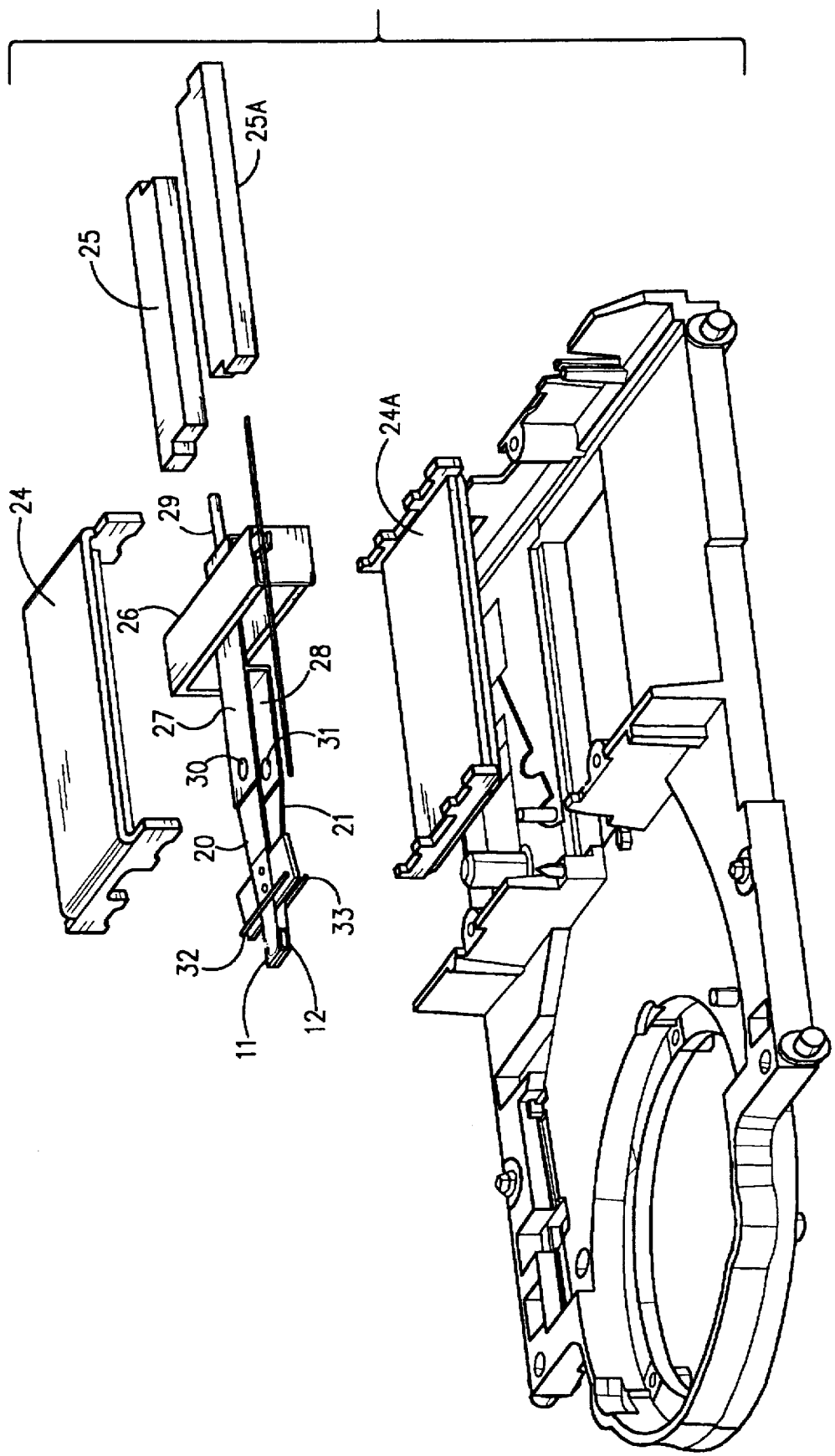
FIG. 4 is a view of the flexures and actuator in a disk drive.
Figure 5:
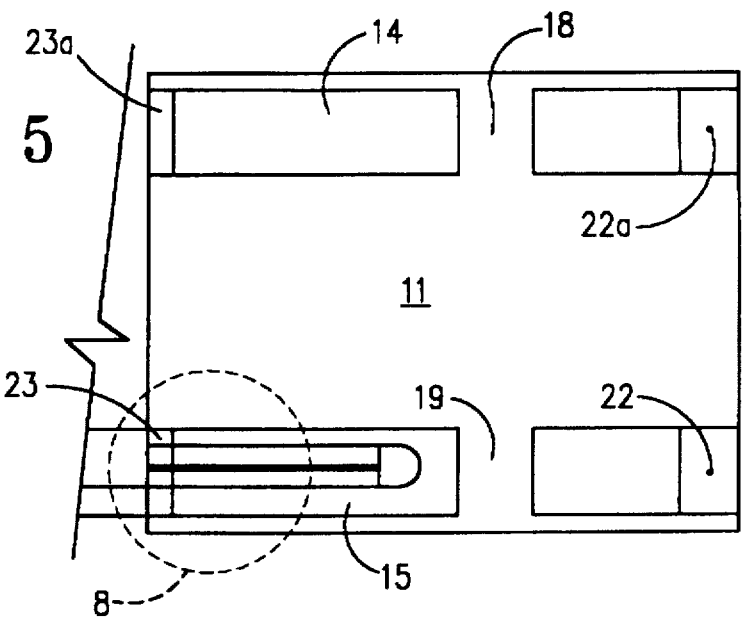
FIG. 5 is a plan view of the preferred embodiment of the invention.
Figure 8:
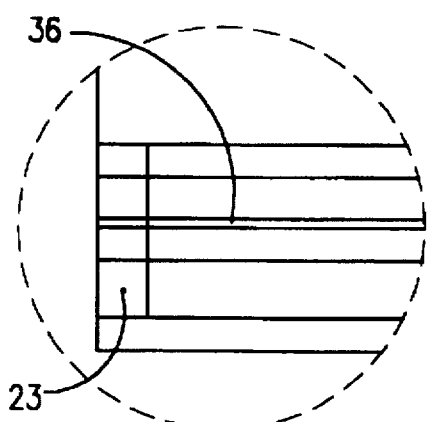
FIG. 8 shows detail 8 of FIG. 5.
Figure 6:
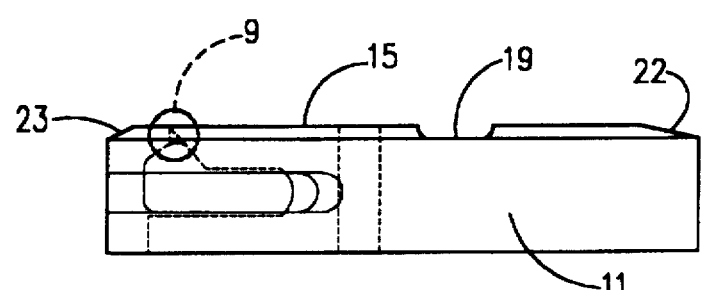
FIG. 6 is a side view of FIG. 5.
Figure 9:
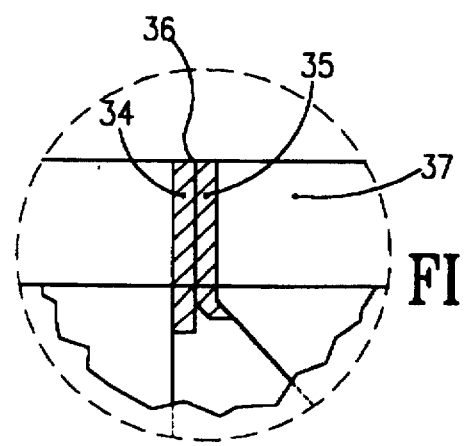
FIG. 9 shows detail 9 of FIG. 6.
Figure 7:
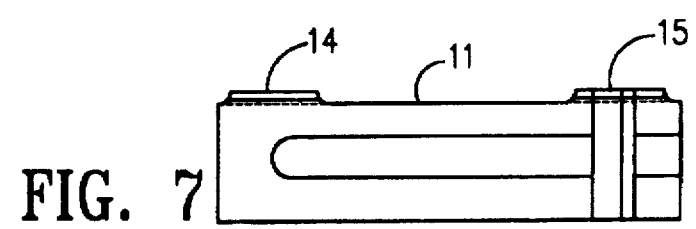
FIG. 7 is a front view of FIG. 5.

FIG. 4 shows the actuator and the flexures in more detail. The actuator is described in more detail in U.S. Pat. No. 5,508,864 dated Apr. 16, 1996, entitled "FLEXURES WHICH REDUCE FRICTION IN AN ACTUATOR FOR A DATA STORAGE DEVICE", the disclosure of which is incorporated herein by reference.

The sliders 11 and 12 are mounted on Winchester type flexures 20 and 21 which have been modified to include the lifting rods 32 and 33. Lifting rods 32 and 33 ride on contour surfaces to load and unload sliders from the disk. Flexures 20 and 21 apply a media load force to the rails.

The voice coil motor for driving the slider assembly into and out of engagement with the recording medium includes outer return path members 24, 24A, and inner return path members 25 and 25A. A two piece coil 26 is mounted on the carriage assembly. When the coil 26 is energized, it interacts with the magnets to move the carriage/subcarriage linearly so that the electro-magnetic elements on sliders 11 and 12 engage concentric tracks on the disk.

The carriage includes two lightweight arms 27 and 28 on which the flexures 20 and 21 are mounted. Flexures 20 and 21 are mounted by gimbals at 30 and 31 to the arms 27 and 28. The carriage/subcarriage assembly travels on a central guide track 29 which is a cylindrical member, a small wire guide in the preferred embodiment.

FIGS. 5–9 show a preferred embodiment of the invention. In this preferred embodiment, the longitudinal length of the slider 11 is 0.08 inch. In this embodiment, the width of the rails is approximately 0.012 inches, which is the length of the slot, and the load force on the rails is approximately 4.5 grams. In such a slider, it has been found that a slot 18 or 19 having a width of approximately 0.010 inch and having a width the same width as the rail, has a sufficient air bleed capacity to make the electro-magnetic element fly at a height of 2 microinches while still maintaining good stability of the flexible magnetic disk.

In this embodiment, the leading bevel 23 has an angle of 20°±3°. The trailing bevel 22 has a taper angle of 50°±10°. The core of the electro-magnetic elements includes MIG (metal-in-gap) materials 34 and 35 on both sides of gap 36. Ferrite 37 surrounds the core. Slider body 11 is zirconia Z-20.1N.

The slider shown in FIGS. 5–9 includes an electro-magnetic element only on one rail. The slider in accordance with the present invention, is such that an electro-magnetic element can be provided on any or all rails of opposed sliders.

We have found that in order to achieve a fly height of approximately 2 microinches on a flexible disk made of approximately 0.0025 inch base material that the following range of parameters will work. Air bleed slots have a width in a range between 0.005 inch to 0.012 inch. The width of the rails is in a range between 0.008 inches and 0.013 inches, the load force on the rails is in the range between 3 grams and 6 grams.

Various modifications may be made. The appended claims are, therefore, intended to cover all such modifications within the true spirit and scope of the invention.

What is claimed is:

1. A magnetic read/write head assembly for reading/writing data on a moving flexible medium and for stabilizing said flexible medium comprising:

a slider;

rails on said slider, each of said rails having a longitudinal length in the direction of movement of said medium and each of said rails having a width extending perpendicular to the direction of movement of said medium, each of said rails having an air bearing surface extending across the width and along the length thereof;

an electromagnetic read/write element extending at least partially across the width of at least one of said rails at the trailing longitudinal end with respect to the direction of movement;

a flexure connected to said slider for applying a load force to said rails;

a slot passing through each of said rails between the ends thereof and extending transverse to the direction of movement, said slot providing an air bleed in each said air bearing surface of said rails, each said slot having a width extending between side walls thereof and extending in the direction of movement in the range between 0.005 inch and 0.012 inch, the width of each of said rails being in a range between 0.008 inch and 0.013 inch, the load force on said rails being in the range between 3 grams and 6 grams; and the air bleed capacity of each said slot, the width of each of said rails, and said load force stabilizing said flexible medium while maintaining a low fly height of said electromagnetic read/write element with respect to said flexible medium.

2. The magnetic read/write head assembly recited in claim 1, wherein said fly height is approximately 2 microinches above said medium when said medium has a 0.0025 inch base material.

3. The magnetic read/write head assembly recited in claim 2, wherein each said slot has a width of approximately 0.010 inches, the width of each of said rails is approximately 0.012 inches and the load force on said rails is approximately 4.5 grams.

4. The magnetic read/write head assembly recited in claim 1 and another opposing magnetic read/write head assembly, wherein said magnetic read/write head assemblies read/record data on both sides of said medium.

5. The magnetic read/write head assembly recited in claim 4 further comprising:

another opposing flexure, said flexures applying said load force to said rails of each respective said magnetic read/write head assembly.

6. The magnetic read/write head assembly recited in claim 5 further comprising:

gimbals for said flexures, each of said flexures being free to move with respect to one another.

7. The magnetic read/write head assembly recited in claim 5 further comprising:

transverse lifting rods on said flexures for loading/unloading each said air bearing surface from said medium.

8. The magnetic read/write head assembly recited in claim 1, wherein each of said rails has a bevel at the leading longitudinal end thereof with respect to the direction of movement.

9. The magnetic read/write head assembly recited in claim 1, wherein said rails are at an angle to said medium with the leading end thereof further from said medium than the trailing edge, with respect to the direction of movement.

10. The magnetic read/write head assembly recited in claim 1, wherein each of said rails has a bevel at the trailing longitudinal end thereof with respect to the direction of movement.

11. The magnetic read/write head assembly recited in claim 1, wherein said rails are wide enough to dampen said medium after said medium passes each said slot and before said medium interacts with said read/write element.

12. The magnetic read/write head assembly recited in claim 1, further including another electromagnetic read/write element on another one of said rails.

13. The magnetic read/write head assembly recited in claim 1, wherein said rails are sufficiently wide to dampen said medium after said medium passes said slots and prior to interaction with said read/write element, thus ensuring that said electromagnetic read/write element is in good coupling with said medium.

* * * * *

UNITED STATES PATENT AND TRADEMARK OFFICE
CERTIFICATE OF CORRECTION

PATENT NO. : 5,636,085
DATED : June 3, 1997
INVENTOR(S) : David E. Jones et al

It is certified that error appears in the above-indentified patent and that said Letters Patent is hereby corrected as shown below:

On the title page, item [54] line 5 and column 1:
Change "HEIGHS" to --HEIGHTS--.

Signed and Sealed this

Ninth Day of September, 1997

Attest:

BRUCE LEHMAN

*Attesting Officer*  *Commissioner of Patents and Trademarks*